United States Patent
Yang et al.

(10) Patent No.: US 9,626,213 B2
(45) Date of Patent: Apr. 18, 2017

(54) SYSTEM AND METHOD FOR FILE INJECTION IN VIRTUAL MACHINE CONFIGURATION

(71) Applicant: Futurewei Technologies, Inc., Plano, TX (US)

(72) Inventors: Shuo Yang, Fremont, CA (US); Cedric Westphal, San Francisco, CA (US); Haiyong Xie, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/595,908

(22) Filed: Jan. 13, 2015

(65) Prior Publication Data

US 2015/0199211 A1    Jul. 16, 2015

Related U.S. Application Data

(60) Provisional application No. 61/927,092, filed on Jan. 14, 2014.

(51) Int. Cl.
*G06F 9/455* (2006.01)
*H04L 29/08* (2006.01)

(52) U.S. Cl.
CPC .......... *G06F 9/45558* (2013.01); *H04L 67/06* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 2009/0282404 A1* | 11/2009 | Khandekar | ......... | G06F 9/45558 718/1 |
| 2012/0246645 A1* | 9/2012 | Iikura | ....... | G06F 8/61 718/1 |
| 2013/0138812 A1* | 5/2013 | Assuncao | ........ | G06F 9/50 709/226 |
| 2014/0095816 A1* | 4/2014 | Hsu | ....... | G06F 3/0655 711/162 |

OTHER PUBLICATIONS

Optimization of file injection in large-scale deployment of virtual machines in OpenStack, Shuo Yang, Dec. 27, 2013.*
Yang, S., "Optimization of File Injection in Large-Scale Deployment of Virtual Machines in OpenStack," Futurewei Technologies Inc., Dec. 27, 2013, 3 pages.

* cited by examiner

*Primary Examiner* — Sisley Kim
(74) *Attorney, Agent, or Firm* — Slater Matsil, LLP (57) ABSTRACT

An embodiment method for virtual machine file injection includes receiving a request for a first image having an operating system and a first set of injected files for a virtual machine. The first set of injected files is compared with second sets of injected files in second images stored on a non-transitory computer readable medium. In response to the first set and second set of injected files not exactly matching, a nearest non-complete candidate image and third files are transmitted, with the third files being files from the first set of injected files that are not in the second set of injected files of the nearest non-complete candidate image.

17 Claims, 4 Drawing Sheets

SYSTEM AND METHOD FOR FILE INJECTION IN VIRTUAL MACHINE CONFIGURATION

PRIORITY CLAIM AND CROSS-REFERENCE

This application claims the benefit of the following provisionally filed U.S. Patent application: Application Ser. No. 61/927,092, filed Jan. 14, 2014, and entitled "System and Method for File Injection in Virtual Machine Configuration," which application is hereby incorporated by reference.

TECHNICAL FIELD

The present invention relates to a system and method for configuring virtual machines, and, in particular embodiments, to a system and method for file injection in virtual machine configuration.

BACKGROUND

Cloud computing platforms, such as the OpenStack platform, are used as infrastructure for cloud computing service platforms. OpenStack, for example, aims to serve large scale systems that launch virtual machines in a massive fashion. In some cloud computing environment, customers start one or more images on a server cluster, with the cloud computing platform separating the processing, memory and computing resources for each started image so that the individual images act as if the image is operating on a separate computer server. The ability to sequester each running image prevents conflicts between images. To make the massive launch process more efficient, bottlenecks in the launch process of single virtual machines should be removed or minimized. When launching a virtual machine, a user should be able specify the files to be put into the image of the operating system before the virtual machine is booted.

SUMMARY

An embodiment method for virtual machine file injection includes receiving a request for a first image having an operating system and a first set of injected files for a virtual machine. The first set of injected files is compared with second sets of injected files in second images stored on a non-transitory computer readable medium. In response to the first set of injected files and second set of injected files not exactly matching, a nearest non-complete candidate image and third files are transmitted, with the third files being files from the first set of injected files that are not in the second set of injected files of the nearest non-complete candidate image.

Another embodiment method for virtual machine file injection includes sending a request to an image service. The request identifies a first image of an operating system and a first set files. A nearest non-complete candidate image and second files are received from the image service, and the second files are files from the first set files that are not in the nearest non-complete candidate image. The nearest non-complete candidate image is started as a first virtual machine on a cloud computing platform the nearest non-complete candidate image is modified with the second files to form a second image.

An embodiment system includes an image service device comprising a first processor and a first non-transitory computer readable medium connected to the first processor. The first non-transitory computer readable medium has stored thereon instructions for causing the first processor to receive a request for a first image identifying an operating system and a first set of files that are not part of the operating system. The first non-transitory computer readable medium further has stored thereon instructions for causing the first processor to access one or more second images stored on a second non-transitory computer readable medium and compare the first set of files with a second set of files in each of the second images. The first non-transitory computer readable medium further has stored thereon instructions for causing the first processor to determine whether one or more the second sets of files matches the first set of files. The first non-transitory computer readable medium further has stored thereon instructions for causing the first processor to transmit, in response to none of the second sets of files matching the first set of files, a nearest non-complete candidate image and third files. The third files are files from the first set of files that are not in the nearest non-complete candidate image.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In large-scale data centers, users have the ability to launch multiple virtual machines with similar or even identical sets of injected files. For example, multiple virtual machines having identical file sets, and thus, identical capabilities, may be launched on a cloud computing platform, permitting a controlling user to isolate system processes and incrementally add to, or remove, processing power, bandwidth, or the like from an overall installation. However, different capabilities are frequently used on different virtual machines. The different capabilities are provided by different file sets installed on a base operating system. For example, a web server installation may have multiple virtual machines running, with more or fewer virtual machines started based on the traffic or processing demand. Such web server virtual machines may each have an operating system such as a Linux operating system distribution, UNIX operating system, Windows® operating system, or the like. Such an operating system provides the basic functionality for processing or the like, and may be run in a virtualized environment such as OpenStack, VMWare, or another cloud computing platform. In such an example, webserver components such as a web server, scripting language interpreters, compilers, middleware connectivity, security components, business logic components, database connections, configuration files, or the like may be added to the base operating system. In other examples, other images may include other components such as business logic, customized storage, security components, secondary or separate web servers, modified configurations or the like.

The images with the operating system and supporting files are copied to a virtual server manager for execution. However, it is inefficient and a waste of computational resources if the same file injection process is performed for each of the virtual machines. Embodiment systems and methods provide for optimized image creation and retrieval, resulting in more rapid creation and startup of one or more image instances. In such embodiments, an image services component receives a request for an image having one or more files injected into the operating system, and finds an existing image from image storage that most closely matches the requested image. The nearest image, along with any files that were requested, but not included in the nearest image, are delivered to a virtual machine (VM) manager, which starts the image, and adds any additional required files and removes excess files that were part of the nearest image. The resulting complete image then contains the operating system and required files, and the complete image is then copied and cataloged for use in other virtual machines.

Figure 1:
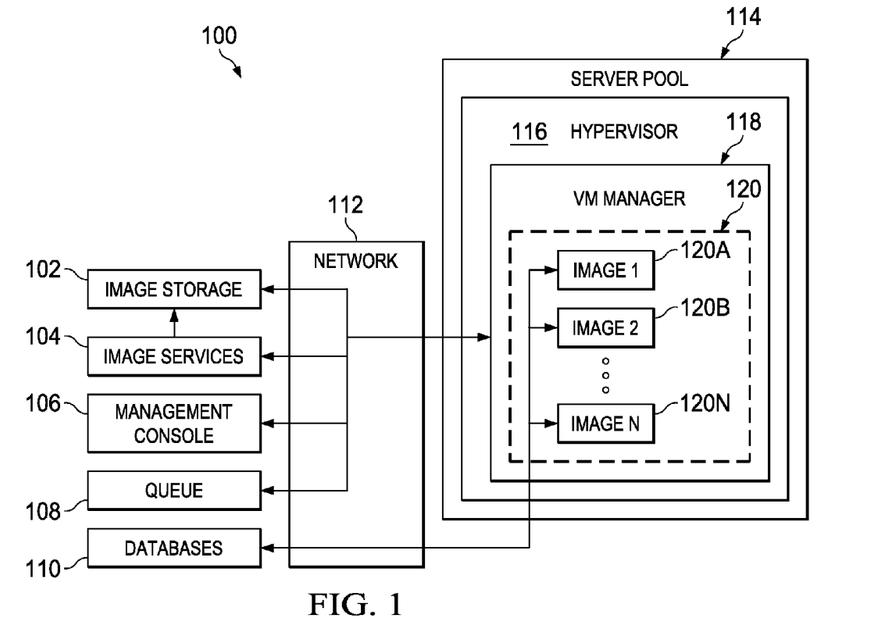
FIG. 1 is a diagram illustrating a cloud computing system for image management and file injection according to some embodiments.

FIG. 1 is a diagram illustrating a cloud computing system 100 for image management and file injection according to some embodiments. The cloud computing system 100 has a server pool 114 and one or more supporting devices 102 . . . 110 connected to the server pool 114 by a network 112. The server pool 114 comprises one or more servers, computers or other devices capable of executing the cloud computing software. In an embodiment where more than one servers is in the server pool 114, the individual servers may be connected by the network 112, by a separate network reserved for the servers of the server pool 114, by sever rack backplanes, by another communications structure, or a combination of communications structures.

In some embodiments, the server pool 114 has a hypervisor 116 running in bare metal or native mode directly on the individual server platforms without any operating system underlying the hypervisor. In other embodiments, the hypervisor 116 runs on the individual server platforms in hosted mode on top of an operating system. The hypervisor 116 presents guest operating systems running on top of the hypervisor 116 with a virtual operating platform and manages the execution of the guest operating systems by emulating a plain server environment for each of the running guest operating system images. Multiple instances of a variety of operating systems may share the virtualized hardware resources provided by the server pool 114.

A VM manager 118 runs in the hypervisor 116, where used, and hosts one or more images 120A . . . 120N that are being run as virtual machines. The images 120A . . . 120N are, in some embodiments, standalone operating system instances that operate independently as if they were on individual servers. The VM manager 118 requests images 120A . . . 120N from the image service 104 in response to incoming VM requests and receives, starts and modifies the running images 120A . . . 120N so that they have the requested file sets. The VM manager 118 also monitors the images 120A . . . 120N while running as virtual machines.

The cloud computing system 100 further has, in some embodiments, an image service 104 that is in communication with image storage 102. In some embodiments, the image service 104 presents an application programming interface (API) that allows requests for images to be received from the VM manager 118. In some embodiments, the image storage 102 is a database, file system, or other storage system with a nontransitory computer readable medium that stores images 120 with any injected files. Additionally, the image storage 102 may store an image manifest, image description file, or the like, describing each image 120 so that the image service 104 can determine which files have been injected into the particular image.

A management console 106 permits control and administration of the VM manager 118, and in some embodiments, the running images 120A . . . 120N. In some embodiments, the management console 106 is a graphical user interface (GUI) or command line interface that sends commands to the VM manager 118 or displays data from the VM manager 118 to a user. In some embodiments, the management console 106 is a component running on the VM manager 118, or on a computer, or server that is remote from, or separate from, the server pool 114. Thus, a user may remotely interact with the VM manager 118 thought he management console 106. A queue 108 handles ordering and scheduling of requests for VM instances. One or more databases 110 are also provided for access by the images 120A . . . 120N.

In an embodiment, operation and file injection in large-scale deployment of virtual machines is performed using one or more OpenStack components. In some embodiments where the cloud computing platform uses the OpenStack system, the VM manager 118 controlling launch of images 120 as virtual machines is carried out by the OpenStack compute service Nova-Compute, which is a cloud computing fabric controller. In some embodiments, Nova-Compute directly downloads operating system image files without injected files from the an image service 104 such as OpenStack's Glance image service 104, which generally provides discovery, registration and delivery services for disk and server images. In some embodiments, The VM manager 118 checks with image services to determine whether an image 120 with the same set of required files is available. If there is an exact match, the VM manager 118 downloads it and bypasses the file injection process. If the required operating system (OS) has no files injected, the Nova-Compute VM manager 118 receives the image file without injected files from the image service 104, performs file injection and boots the image 120 as a virtual machine. After the virtual machine is booted, the Nova-Compute VM manager 118 takes a snapshot of it, which is essentially an image 120 of the operating system with all injected files. The snapshot is then uploaded to the Glance image service 104 and can be used by subsequently launched virtual machines. In this way, the file injection process only needs to be performed when the first virtual machine is launched, and the copied image can be used to launch virtual machines with the same set of injected files.

If there are images with some, but not all, required files (partial overlap or subset), the image service 104 provides the image with the most overlap, or a nearest non-complete image. If there exists an image with all required files and some extras (superset), or with some required files and some excess files, this image is preferred compared to images with partial overlaps or smaller overlaps. This is because file removals are cheaper than file injections. In those two cases, snapshots are not taken and uploaded before file injection and removal, and in some embodiments are, instead, taken after file injection and file removal.

In the case when an image service 104, such as Glance, receives multiple requests at the same time, it estimates the overall cost of file injection/removal and snapshot generation using a distance metric calculation that determines which base image is closest to the requested images based on the number of missing files, the byte size of the missing files, the time needed to transfer additional missing files, or other factors. It then sends out images and any missing required files to minimize the overall cost of generating all of the requested images. An embodiment computes the distance from the requested set of OS and files with that of precompiled/predefined systems, and selects the OS and file combination that minimizes the download impact on the server. In an embodiment, extra files can be included in the downloaded image, and which are then removed, if this reduces or removes the cost of downloading the image. Based upon the OS and files requested, the server requests a compiled image from a subset of a combination of IOS and injected files that minimizes the download cost to the server in terms of transfer times or minimizes the download cost in combination with injection costs or file removal costs. In some embodiments, factors reflecting the congestion on the network or at the server may be used to adjust the calculation of the download costs.

In an embodiment optimization, the file injection process is performed only when the first virtual machine is launched, and it has been discovered that later launch processes for the same images will be about 20% faster than the launch of the original image. A great deal of time and computational resources are saved when a large number of virtual machines are launched with the same set of injected files.

Embodiments may be implemented in applications such as cloud computing, data centers, OpenStack-compatible servers, and the like. Further, while embodiments are described herein in the context of OpenStack, embodiments may be implemented in any cloud computing platform that implements virtual machines launched from images and OS and injected files.

Figure 2:
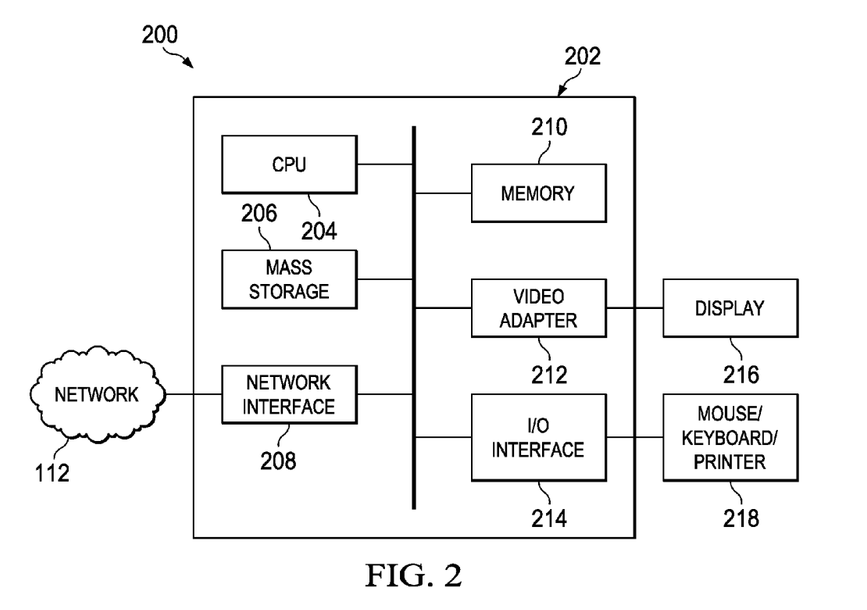
FIG. 2 is a diagram illustrating a computing platform that may be used for implementing, for example, the devices and methods described herein, according to some embodiments.

FIG. 2 is a diagram illustrating a computing platform 200 that may be used for implementing, for example, the devices and methods described herein, according to some embodiments. Specific devices may utilize all of the components shown, or only a subset of the components and the levels of integration may vary from device to device. Furthermore, a device may contain multiple instances of a component, such as multiple processing units 202, processors 204, memories 210, network interfaces 208, transmitters, receivers, etc. The computing platform 200 may comprise a processing unit 202 connected to one or more input/output devices 218, such as a speaker, microphone, mouse, touchscreen, keypad, keyboard, printer, display, and the like. The processing unit 202 may include a central processing unit (CPU) 204, memory 210, a mass storage device 206, a video adapter 212, and an I/O interface 214 connected to a bus.

The bus may be one or more of any type of several bus architectures including a memory bus or memory controller, a peripheral bus, video bus, or the like. The CPU 204 may comprise any type of electronic data processor. The memory 210 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 210 may include ROM for use at boot-up, and DRAM for program and data storage for use while executing programs.

The memory 210 may, in some embodiments, have instructions stored thereon for causing the processor 204 to perform the methods and processes described herein.

The mass storage device 206 may comprise any type of non-transitory storage device configured to store data, programs, and other information and to make the data, programs, and other information accessible via the bus. The mass storage device 206 may comprise, for example, one or more of a solid state drive, hard disk drive, a magnetic disk drive, an optical disk drive, or the like.

The video adapter 212 and the I/O interface 214 provide interfaces to couple external input and output devices to the processing unit 202. As illustrated, examples of input and output devices include the display 216 coupled to the video adapter 212 and the mouse/keyboard/printer 218 coupled to the I/O interface 214. Other devices may be coupled to the processing unit 202 and additional or fewer interface cards may be utilized. For example, a serial interface such as Universal Serial Bus (USB) (not shown) may be used to provide an interface for a printer.

The processing unit 202 also includes one or more network interfaces 208, which may comprise wired links, such as an Ethernet cable or the like, and/or wireless links to access nodes or different networks. The network interface 208 allows the processing unit 202 to communicate with remote units via one or more networks 112. For example, the network interface 208 may provide wireless communication via one or more transmitters/transmit antennas and one or more receivers/receive antennas. In an embodiment, the processing unit 202 is coupled to a local-area network or a wide-area network for data processing and communications with remote devices, such as other processing units, the Internet, remote storage facilities, or the like.

Figure 3:
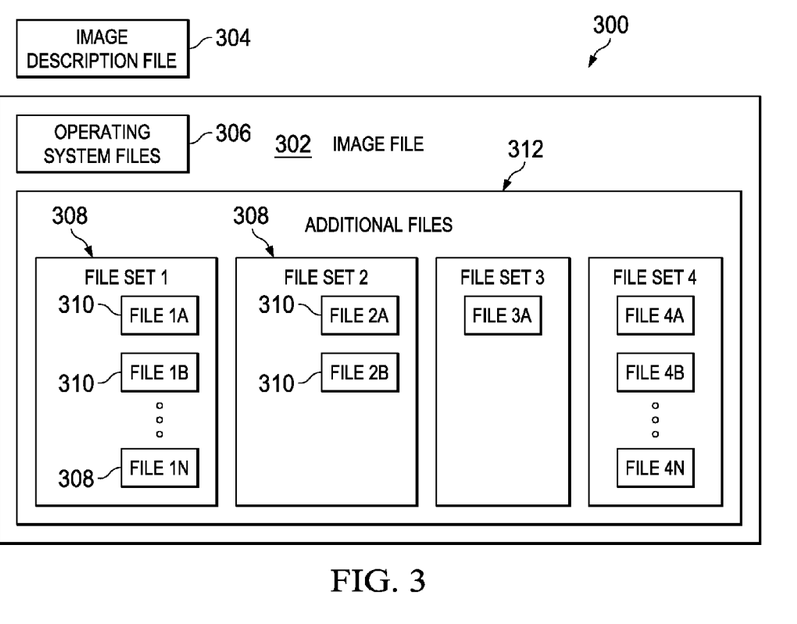
FIG. 3 is a diagram illustrating a storage arrangement for a compiled image according to some embodiments.

FIG. 3 is a diagram illustrating a storage arrangement for a compiled image 300 according to some embodiments. An image 300 comprises an image file 302 having one or more operating system files 306 and one or more additional files 312 that have been injected into the OS. In some embodiments, the additional files 312 comprise one or more file sets 308. The file sets 308 each comprise one or more files 310 that have been injected into the operating system files 306. An image description file 304 has one or more data entries describing the operating system files 306, the file sets 308, and the additional files 312. In some embodiments, the image description file 304 is an extensible markup language (XML) file, a file using another markup language, a database file, a database entry, a flat file, a text file, or another file structure. The image description file 304 may have an entry or descriptor describing the producer, version, distribution or other identifying information for the overall operating system distribution or components, as well as an entry or descriptor for the additional files 312, for each file set 308, or for each file 310 in each file set 308. For example, an XML type image description file 304 may have an entry tagged as an operating system, with the tagged data representing the particular Linux distribution and distribution version number or identifier. Such an XML image description file 304 may also include tagged entries identifying complete file sets 308 or individual files 312 from particular file sets 308. For example, a compiled image 300 may include a Ubuntu™ Linux distribution, with additional file sets including an nginx web server, PHP interpreter and Oracle database connection injected into the operating system. In such an example, the image description file 304 may include a text description of the operating system name, distribution, and version number, and a text description of the nginx web server package, the PHP interpreter package and version number, and the Oracle database connection package. Each of the package descriptions described above may also include sub-entries describing particular files within packages, including configuration files, optional files or additional components. In other embodiments, the image description file 304 may have other types of identifiers for each of the entries, such as, for example, hash values, binary identifiers, or the like. In yet other embodiments, the image description file 304 is an entry in an image description database or other agglomerate data entry structure with entries for multiple image descriptions.

Figure 4:
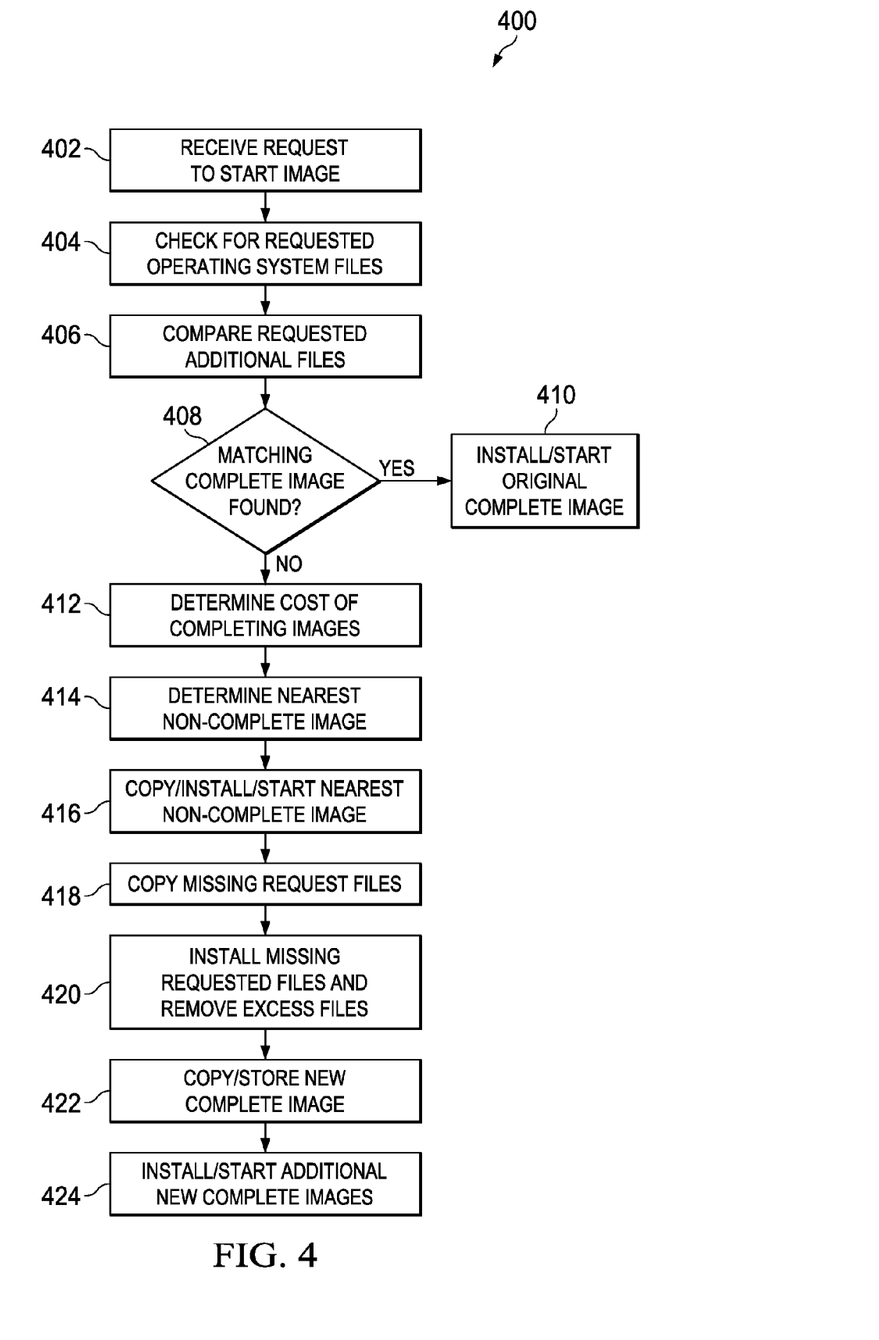
FIG. 4 is a diagram illustrating a method for finding and compiling images according to some embodiments.

FIG. 4 is a diagram illustrating a method 400 for finding and compiling images according to some embodiments. Initially, a request to start an image is received at the VM manager 118 in block 402. In some embodiments, the queue 108 receives, orders, and schedules the requests for the VM manager 118. The request to start the image includes an identification of the operating system files 306 and any additional files 312. The VM manager 118 requests the image file 302 from the image service 104, and the image service 104 checks for the requested operating system files 306 in block 404 and compares the requested additional files in block 406. In some embodiments, the image service 104 finds image files 302 with matching operating system files 306 by matching information from the image description file 304 with information from the request to start the image. Once image files 302 with matching operating system files 306 are found, the image service 104 compares the additional files 312 in each image file 302 to the requested additional files by matching information from the image description file 304 with information from the request to start the image. In block 408, the image service 104 determines whether a matching complete image is found. Such a matching complete image file 302 has the operating system files 306 and additional files 312, without extra files, or with extra files that may be disregarded. If the matching complete image file is found, the matching image file is transmitted to the VM manager 118, which starts the image as a virtual matching in block 410.

If no complete matching image file is found in block 408, the cost of completing the non-complete image files is determined in block 412. In different embodiments, the cost of completing non-complete image files is determined by download costs, by download costs in combination with injection costs, by a graph distance metric calculation, or by another metric.

In an embodiment where the download cost is used to determine the nearest candidate non-complete image, the candidate non-complete image files are compared to the requested image file. Assuming that the operating system files 306 represent the largest portion of a requested image file, the candidate non-complete image files will have the requested operating system files. Thus, the additional files 312 from each candidate non-complete image file are compared to the requested additional files. For each candidate non-complete image, the download cost ($Cost_{dl}$) of the missing files, that is the files that were requested but that are not in the particular candidate non-complete image, is determined according to Equation 1:

$$Cost_{dl} = \Sigma S_{mf} \qquad (1)$$

In equation 1, $S_{mf}$ is size of each missing file. Thus, the total cost ($Cost_{dl}$) is the sum of the sizes of all missing files, and the cost is proportional to the absolute size of the missing files.

In an embodiment where the download cost in combination with injection cost are considered as part of the cost of completing the image, the sum of injection costs for missing files may be included in the download cost. Thus, for each candidate non-complete image, the injection cost ($Cost_{in}$) of the missing files, that is the files that were requested but that are not in the particular candidate non-complete image is determined according to Equation 2:

$$Cost_{in} = \Sigma(S_{mf} + I_{mf}) \qquad (2)$$

In equation 2, $S_{mf}$ is the size of each missing file, and $I_{mf}$ is the injection cost of each missing file. In such an embodiment, the size of each missing file may represent the time or computing resources necessary to move the missing file to VM manager, which may vary depending on network conditions. Thus, the total cost ($Cost_{in}$) is the sum of the sizes of all missing files plus the cost of injecting each missing file into the image. In some embodiments, the injection cost $I_{mf}$ may be determined for the individual files, or may be determined for each a file set. The injection cost $I_{mf}$ may include, for example, the cost of registering a file or component with the operating system, setting permissions, creating or modifying a new or existing configuration file, or the like.

In other embodiments, the cost of removing excess files in each candidate non-embodiment image may be calculated as part of the cost of completing the image. Thus, for each candidate non-complete image, the download/injection cost ($Cost_{in}$) of the missing files is determined according to Equation 3:

$$Cost_{in} = \Sigma(S_{mf} + I_{mf}) + \Sigma R_{ef} \qquad (3)$$

In equation 3, $S_{mf}$ is the size or transfer cost of each missing file, $I_{mf}$ is the injection cost of each missing file, and $R_{ef}$ is the cost of removing each excess file. In some embodiments, $I_{mf}$ is the time to inject a missing file, and $R_{ef}$ is expressed as a time to remove a particular file. In such an embodiment, $S_{mf}$ may be converted from a file size into a time-to-transfer the missing files. Thus, the total cost ($Cost_{in}$) is the sum of the sizes of all missing files or cost of moving the missing files, plus the cost of injecting each missing file into the image, plus the cost of removing excess files.

In other embodiments, the cost of transporting the excess files in each candidate non-embodiment image prior to removing those excess files may also be calculated as part of the cost of completing the image. Thus, for each candidate non-complete image, the download/injection cost ($Cost_{in}$) is determined according to Equation 4:

$$Cost_{in} = \Sigma(S_{mf} + I_{mf}) + \Sigma(T_{mf} + R_{ef}) \qquad (4)$$

In equation 4, $S_{mf}$ is the size or transfer cost of each missing file, $I_{mf}$ is the injection cost of each missing file, $T_{mf}$ is the transport cost of the excess files, $R_{ef}$ is the cost of removing each excess file. As discussed above the variables in Equation 4 may be converted into the same unit to normalize the results. Thus, the total cost ($Cost_{in}$) is the sum of the sizes of all missing files or cost of moving the missing files, plus the cost of injecting each missing file into the image, plus the cost of transporting the excess files, plus the cost of removing excess files after transport to the VM manager 118.

In yet other embodiments, the costs may be weighted to account for various environment conditions such a processing speed, computing load, resource bottlenecks, network congestion, or the like. Thus, for each candidate non-complete image, the download/injection cost ($Cost_{in}$) is determined according to Equation 5:

$$Cost_{in} = \Sigma(\alpha S_{mf} + \beta I_{mf}) + \gamma R_{ef} \qquad (5)$$

In equation 5, $S_{mf}$ is the size or transfer cost of each missing file, $I_{mf}$ is the injection cost of each missing file, $R_{ef}$ is the cost of removing each excess file. The variables α, β and γ are tuning variables used to weight each of the factors in Equation 5. For example, when a network 112 between the images service 104 and VM manager 118 is congested, α may be increased to account for the extra time it would take to move the missing files to the VM manager. In another example, β and γ may be modified according to the processing or memory loads of the VM manager 118. Since the tuning variables are used to reflect dynamic conditions, the tuning variables may also be dynamic, with the values for each variable set based on conditions at a particular time. Additionally, while the tuning variables are shown above as modifying the calculations of Equation 3, such an embodiment is not limiting, as any of the calculations may be tuned for environmental conditions.

In some embodiments, a request for multiple images may be sent to the image service 104. In such an embodiment, the image service 104 may calculate the stored image that, while non-complete, is closest to all of the requested image files. Such a calculation may be performed using a graph distance metric calculation. Such a graph distance metric calculation may be an optimization using the equations listed above. The graph distance metric calculates the cost associated with completing each of the requested images from a candidate non-complete image, with the cost being the sum of the cost to achieve each completed image. Such a calculation may be optimized by determining the costs of all possible combinations of image generation from a single base image to the completed set of requested images. For example, where three image files are requested, a set of candidate non-complete images are identified. The cost for each combination of image generation orders may be determined by determining the cost of forming the first image directly from a candidate image, and then the cost of forming the second image from the first image and, separately, forming the second image directly from the first image. The cost is further calculated by separately determining the cost of forming the third image directly from each of the second images, directly from the first image, and directly from the candidate image. The process is repeated for each possible combination of image orders, with the order resulting in the lowest cost being selected for the production of the images. In such an embodiment, the image service 104 may send instructions to the VM manager indicating the order of forming the images, and which base image from which each new image is formed.

In block 414, the nearest non-complete image is determined by the image service 104. The nearest candidate non-complete image may be considered to be the image with the lowest cost of completion. In block 416, the nearest non-complete image is sent to the VM manager 118, where it is installed and/or executed. Any missing additional files are copied to the VM manager 118 in block 418, and in block 420, the missing requested additional files are installed in the image, and any excess files removed from the image. In block 422, a copy of the newly completed image is made by the VM manager 118 and sent to the image service 104, which catalogs the image by making an image description file and storing the image in the image storage. Additional instances of the newly completed image are installed or started in block 424. The additional image instances may be started from images copied directly from the newly installed and running image, for example, when a VM manager receives a request to start multiple instances of the same image. The additional image instance may also be started from the image service 104, for example, when the image is requested from another cloud computing platform or at a different time.

Figure 5:
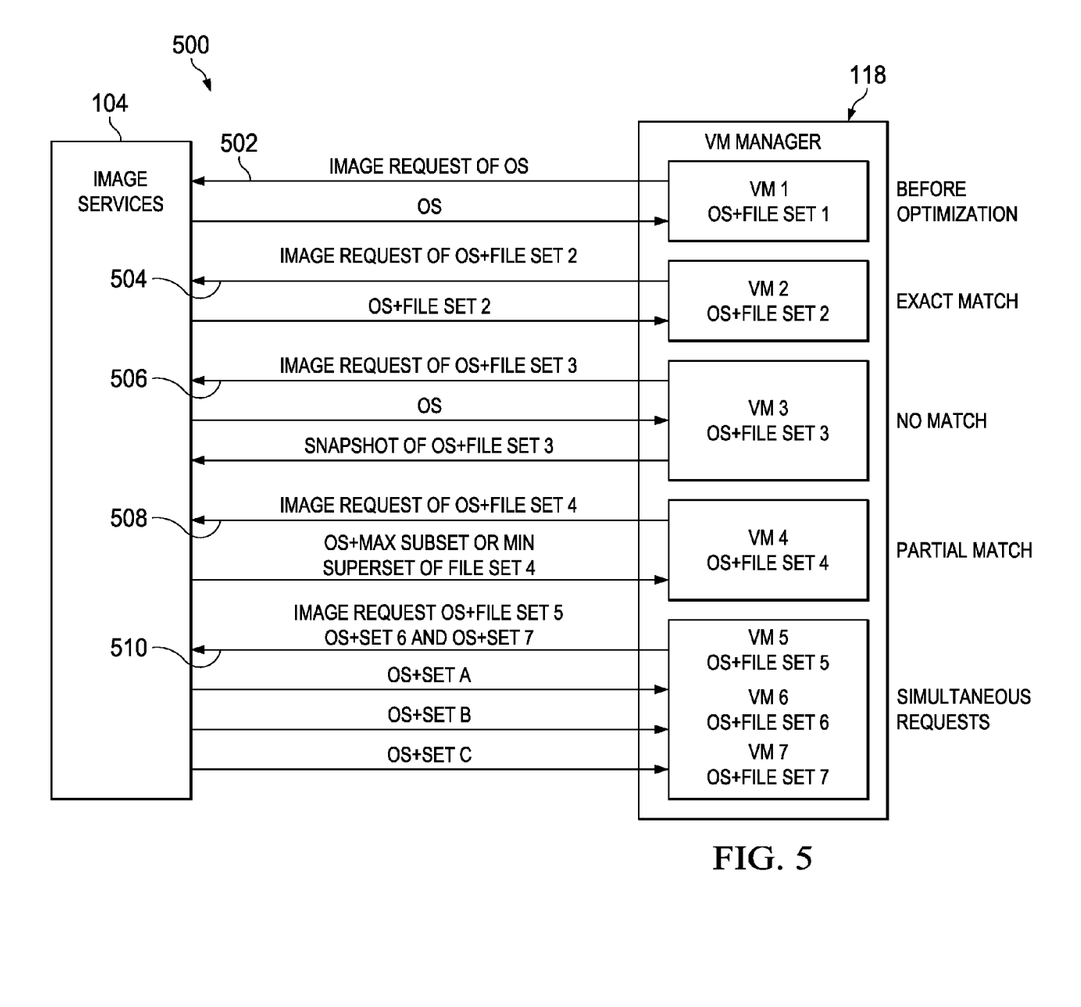
FIG. 5 is a diagram illustrating an embodiment with virtual machines having various file set requirements.

FIG. 5 is a diagram illustrating an embodiment system 500 with virtual machines having various file set requirements. A first request 502 calls for an OS without any additional files, which is sent directly from the image service 104 to the VM manager since the request most likely matches the existing base operating system image. A second request 504 requests an operating system image with the requested file set, and the image service 104 sends the image with the additional files in the file set directly to the VM manager 118 since an existing image with the requested file set exists in image storage 102. A third request 506 requests an operating system image with a file set, and no image has any of the additional files from the file set. In response to such a request, the image service 104 sends the base operating system image and the file set separately, that is without the file set injected into the operating system image. The VM manager 118 then injects the file set into the operating system and sends a snapshot of the newly created image back to the image service 104. A fourth request 508 requests an operating system image and file set, and the image service 104 finds a nearest non-complete candidate that has at least one file from the requested file set. The image service 104 sends the VM manager 118 the nearest non-complete image and any missing files, and the VM manager 118 then injects any missing files and removes the excess files. A fifth request 510 requests multiple operating system images, each having different files sets. The image service 104 finds the nearest non-complete candidate, and sends the image with the missing files to the VM manager 118. The VM manager 118 then starts the images and injects the requested file sets, or removes excess files, where needed.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method for virtual machine file injection, comprising:
receiving a request for a first image having an operating system and a first set of injected files for a virtual machine;
comparing the first set of injected files with second sets of injected files in second images stored on a non-transitory computer readable medium;
determining, in response to the first set of injected files and second set of injected files not exactly matching, a cost of completion of each of one or more of the second images; and
transmitting, in response to the first set of injected files and second set of injected files not exactly matching, a selected non-complete candidate image and third files from the first set of injected files that are not in the second set of injected files of the selected non-complete candidate image, wherein the selected non-complete candidate image is a second image selected from the second images according to the cost of completion of each of one or more of the second images;

wherein the cost of completion of each of one or more of the second images is a cost to modify a respective one of the second images to have the first set of injected files;

wherein the selected non-complete candidate image is the one or more of the second images with a lowest cost of completion; and wherein the request for the first image is a request for at least the first image of the operating system and the first set of injected files and a third image of the operating system and a third set of injected files, and wherein the cost of completion is determined using a graph distance metric calculation.

2. The method of claim 1, further comprising:
transmitting, in response to the first set of injected files and second set of injected files exactly matching, the first image of the operating system and the first set of injected files for launching the virtual machine.

3. The method of claim 1, wherein the cost of completion comprises a cost of transmitting third files in the first set of injected files that are missing from the respective one of the second images.

4. The method of claim 3, wherein the cost of completion further comprises at least one of an injection cost of the third files.

5. The method of claim 4, wherein the cost of completion further comprises a cost of removing fourth files that are not in the first set of injected files from the respective one of the second images.

6. The method of claim 1, further comprising:
receiving a fourth image of an operating system having the first set of injected files injected therein; and
storing the fourth image in the non-transitory computer readable medium.

7. The method of claim 6, wherein the receiving the request for the first image, the comparing the first set of injected files with the second sets of injected files, and the transmitting the selected non-complete candidate image and third files are performed by an image service; and
wherein the fourth image is received by the image service from a virtual machine manager.

8. A system comprising:
an image service device comprising a first processor and a first non-transitory computer readable medium connected to the first processor and having stored thereon instructions for causing the first processor to:
receive a request for a first image identifying an operating system and a first set of files that are not part of the operating system;
access one or more second images stored on a second non-transitory computer readable medium;
compare the first set of files with a second set of files in each of the second images; files; and
determine whether one or more the second sets of files matches the first set of files; and
determine, in response to none of the second sets of files matching the first set of files, a selected non-complete candidate image by determining a cost of completion of each of one or more of the second images;
transmit, in response to none of the second sets of files matching the first set of files, the selected non-complete candidate image and third files, wherein the third files are files from the first set of files that are not in the second set of files of the selected non-complete candidate image, wherein the selected non-complete candidate image is a second image selected from the second images according to the cost of completion of each of one or more of the second images;

wherein the cost of completion of each of the one or more of the second images is a cost to modify the respective one of the second images to have the first set of files; and wherein the selected non-complete candidate image is the one or more of the second images with a lowest cost of completion; and wherein the request for the first image is a request for at least the first image of the operating system and the first set of files and a third image of the operating system and a third set of injected files, and wherein the cost of completion is determined using a graph distance metric calculation.

9. The system of claim 8, further comprising:
a virtual machine (VM) manager device connected to the image service device, the VM manager device comprising a second processor and a third non-transitory computer readable medium having stored thereon instructions for causing the second processor to:
send the request for the first image to the image service device;
receive, from the image service device, the selected non-complete candidate image and third files;
start the selected non-complete candidate image as a first virtual machine; and
modify the selected non-complete candidate image with the third files to form a third image.

10. The system of claim 9, wherein the VM manager device is a server pool of a cloud computing platform;
wherein the VM manager device is a separate device from the image service device; and
wherein the VM manager device is connected to the image service device by a network.

11. The system of claim 9, wherein the instructions to modify the selected non-complete candidate image comprises instructions causing the processor to perform at least one of injecting the third files into the selected non-complete candidate image and removing fourth files from the selected non-complete candidate image that are not in the first set of files.

12. The system of claim 9, wherein the third non-transitory computer readable medium further has stored thereon instructions for causing the second processor to:
start one or more second virtual machines from the third image.

13. A method, comprising:
receiving, at an image service device, a request from virtual machine (VM) manager device connected to the image service device, wherein the request identifies a first set of files associated with a first image;
comparing the first set of files with each one of second sets of files that are stored on a non-transitory computer readable medium, each of the second sets of files associated with one of a plurality of second images;
determining a first one of the plurality of second images to be a candidate image in response to the first set of files matching one of the second sets of files associated with the first one of the plurality of second images;
determining, in response to the first set of files not matching any of the second sets of files, a cost of completion of each of the plurality of the second images;
determining, as the candidate image and in response to the first set of files not matching any of the second sets of files, a second one of the plurality of second images associated with a first one of the second sets of files that is most similar to the first set of files according to the cost of completion of each of the plurality of second images; and sending data including the candidate image to the VM manager device for running a virtual machine on a cloud computing platform;

wherein, the data further includes, in response to the first set of files not matching any of the second sets of files, third files from the first set of files that are not in the first one of the second sets of files;

wherein the cost of completion of each of the plurality of second images is a cost to modify the respective one of the second images to have the first set of files;

wherein the candidate image is the one of the plurality of second images with a lowest cost of completion; and wherein the request for the first image is a request for at least the first image which is an image of an operating system, and the first set of files and a fourth image of the operating system and a fourth set of injected files, and wherein the cost of completion is determined using a graph distance metric calculation.

14. The method of claim 13, further comprising:
receiving, by the image service device, a third image sent by the VM manager device, the third image corresponding to the first image, wherein the third image is associated with a third set of files; and
storing the third files as one of the second sets of files.

15. The method of claim 13, wherein the one of the plurality of second images associated with a third one of the second sets of files having a lowest cost of completion is determined to be the most similar to the first set of files.

16. The method of claim 15, wherein the cost of completion of each of the second sets of files includes a cost to modify the respective one of the second sets of files to have the first set of files.

17. The method of claim 16, wherein the cost of completion further includes a cost of transmitting third files in the first set of injected files that are missing from a respective one of the second sets of files.

* * * * *